(12) United States Patent
Tan et al.

(10) Patent No.: US 7,848,881 B2
(45) Date of Patent: Dec. 7, 2010

(54) AUTOMATIC PAST ERROR CORRECTIONS FOR LOCATION AND INVENTORY TRACKING

(75) Inventors: Han-Shue Tan, Concord, CA (US); Larry Henry, Berkeley, CA (US)

(73) Assignee: ContainerTrac, Inc., Emeryville, CA (US)

( * ) Notice: Subject to any disclaimer, the term of this patent is extended or adjusted under 35 U.S.C. 154(b) by 0 days.

(21) Appl. No.: 11/478,991

(22) Filed: Jun. 29, 2006

(65) Prior Publication Data

US 2007/0010940 A1 Jan. 11, 2007

Related U.S. Application Data

(60) Provisional application No. 60/696,619, filed on Jul. 5, 2005.

(51) Int. Cl.
 G01C 21/00 (2006.01)
 G08G 1/123 (2006.01)

(52) U.S. Cl. ........................ 701/207; 701/213; 701/214; 701/216; 701/217; 701/220; 700/213; 700/214; 700/228; 700/229; 342/357.01; 342/357.02; 342/357.03; 342/357.06; 342/357.14; 340/988; 340/995.1; 340/995.25; 340/995.28

(58) Field of Classification Search ................ 701/1, 701/200, 207–221; 700/213–214, 228–229, 700/244; 342/357.01–357.14, 358; 340/988, 340/990, 994, 995.1–995.18, 995.25, 995.28
See application file for complete search history.

(56) References Cited

U.S. PATENT DOCUMENTS 5,272,483 A * 12/1993 Kato .................... 342/357.14
5,422,639 A *  6/1995 Kobayashi et al. ......... 340/988
5,739,787 A *  4/1998 Burke et al. ........... 342/357.07

(Continued)

FOREIGN PATENT DOCUMENTS

GB 2 323 989 A 10/1998

(Continued)

OTHER PUBLICATIONS

International Search Report dated May 16, 2008 for Application No. PCT/US2006/025929, 11 pages.

*Primary Examiner*—Jack Keith
*Assistant Examiner*—Chuong P Nguyen
(74) *Attorney, Agent, or Firm*—Fliesler Meyer LLP (57) ABSTRACT

A system is provided for tracking and maintaining an inventory of location of containers that are stored on cargo ships or in a container yard. The system includes one or more sensors, such as GPS and INS sensors for obtaining real-time position information, as well as a processor configured to automatically provide post processing to recover lost data and to correct erroneous data, such as when real-time position signals are blocked or distorted, the post processing performed by estimating trajectories and correcting the location errors. Post-processed positioning techniques are continuously applied to the stored position data to iteratively determine calibrated position locations to provide calibrated second trajectory segments in a real-time fashion. The calibrated second trajectories are then used to identify the errors in the past real-time position data as soon as a segment of the second calibrated trajectory becomes statistically trustworthy. Corrections can be automatically made in inventory locations stored in a database to correct position errors for the containers.

14 Claims, 7 Drawing Sheets

U.S. PATENT DOCUMENTS

| | | | |
|---|---|---|---|
| 5,780,826 A | | 7/1998 | Hareyama |
| 5,835,377 A | * | 11/1998 | Bush .......................... 700/99 |
| 6,094,607 A | * | 7/2000 | Diesel ........................... 701/4 |
| 6,266,008 B1 | | 7/2001 | Huston et al. .......... 342/357.09 |
| 6,317,688 B1 | | 11/2001 | Bruckner et al. ............. 701/213 |
| 6,401,036 B1 | * | 6/2002 | Geier et al. ................. 701/214 |
| 6,408,245 B1 | | 6/2002 | An |
| 6,427,122 B1 | | 7/2002 | Lin ............................ 701/214 |
| 6,502,033 B1 | | 12/2002 | Phuyal ....................... 701/214 |
| 6,516,272 B2 | | 2/2003 | Lin ............................ 701/214 |
| 6,577,921 B1 | | 6/2003 | Carson ....................... 700/214 |
| 6,611,755 B1 | | 8/2003 | Coffee et al. ................ 701/213 |
| 6,615,135 B2 | | 9/2003 | Davies ....................... 701/213 |
| 6,615,136 B1 | | 9/2003 | Swope et al. ................ 701/214 |
| 6,657,586 B2 | | 12/2003 | Turner ................... 342/357.07 |
| 6,694,260 B1 | | 2/2004 | Rekow ....................... 701/214 |
| 6,697,736 B2 | | 2/2004 | Lin ............................ 701/214 |
| 6,728,637 B2 | | 4/2004 | Ford et al. ................... 701/213 |
| 6,731,237 B2 | | 5/2004 | Gustafson et al. ....... 342/357.06 |
| 6,766,247 B2 | | 7/2004 | Mosis ........................ 701/207 |
| 6,801,159 B2 | | 10/2004 | Swope et al. ........... 342/357.14 |
| 6,804,621 B1 | | 10/2004 | Pedanckar .................... 702/94 |
| 6,810,324 B1 | | 10/2004 | Nadkarni .................... 701/207 |
| 6,826,478 B2 | | 11/2004 | Riewe et al. ................ 701/220 |
| 6,853,687 B2 | | 2/2005 | Harrington et al. .......... 375/259 |
| 6,876,326 B2 | | 4/2005 | Martorana .................. 342/463 |
| 2002/0065603 A1 | * | 5/2002 | Watanabe et al. ........... 701/207 |
| 2002/0169553 A1 | * | 11/2002 | Perlmutter et al. .......... 701/214 |
| 2004/0257276 A1 | | 12/2004 | Huston |

FOREIGN PATENT DOCUMENTS

| | | | |
|---|---|---|---|
| JP | 11183590 | * | 7/1999 |

* cited by examiner

AUTOMATIC PAST ERROR CORRECTIONS FOR LOCATION AND INVENTORY TRACKING

CROSS-REFERENCE TO PROVISIONAL APPLICATION

This patent application claims the benefit of Provisional Application No. 60/696,619 filed Jul. 5, 2005.

BACKGROUND

1. Technical Field

The present invention relates to tracking the location of containers that are carried on ships, railroad cars or trucks, or stored in freight yards. More particularly, the present invention relates to tracking and inventory of containers using a satellite Global Positioning System (GPS) and an Inertial Navigation System (INS). The INS can be replaced or supported by a combination of inertial sensors, speed sensors, and sensors indicating rotation or movement direction in combination with the GPS.

2. Related Art

Position or location tracking is a crucial component of many inventory and resource monitoring and management systems. Typical location tracking systems employ real-time positioning sensors that continuously or periodically provide position solutions for location tracking. These sensors or systems commonly acquire locations of vehicles, equipment, or inventory based on principles of either triangulation or proximity with respect to known locations using various electronic positioning means such as a Global Positioning System (GPS), Differential Global Positioning System (DGPS), Integrated Differential Global Positioning System and Inertial Navigation System (DGPS/INS), Real Time Locating System (RTLS), RTLS/GPS, RTLS/INS, transponders, ultra wideband locating system, or some combinations of the above systems.

For example, U.S. Pat. No. 6,577,921 discloses a container tracking system that tracks the real-time positions of the container handling equipment using GPS, INS and wireless communication. U.S. Pat. No. 6,657,586 describes a Real Time Locating system and method for locating an object with a tag attached to the object and with remote readers each with a GPS receiver. U.S. Pat. No. 6,266,008 discloses a system and method for determining the location of freight containers in a freight yard by attaching GPS receivers to each container. U.S. Pat. No. 6,611,755 describes a timing control method for a fleet management system using a communication, status sensor and positioning system. U.S. Pat. No. 6,876,326 discloses a location tracking system using communication search mode ranging techniques.

Limitations in physics, however, generally prevent the real-time positioning systems from achieving 100% reliability or accuracy. Examples of those limitations with respect to radio-wave positioning are: obstacles blocking line of sight position signals, or signals reflected from near-by surfaces (multi-path). Further practical limitations in sensor technologies include biases in measurements, or poor signal to noise ratio resulting from environment sources. These limitations result in common positioning errors such as inaccuracies, loss of position, or location drifts causing erroneous position data.

To overcome the physical and practical limitations, many real-time positioning systems employ complimentary sensors, or digital maps to improve accuracy and reliability. As an example, the complimentary nature of Inertial Navigation System (INS) and Global Positioning System (GPS) are the main reasons why the integrated GPS/INS system is becoming increasingly popular. The high, long-term accuracy of GPS can be combined with the high output rate, robustness and reliability of INS to deliver superior positioning performance. Depending on how information is shared and processed between GPS, INS and the integration computer, the integrated system architecture can be classified into three categories: loosely coupled system, tightly coupled system and deeply coupled (ultra-tight coupled) system. All these integration methods improve the real-time positioning performance.

In addition to INS systems to complement GPS, other components have been used for navigation of vehicles or aircraft to provide better measurements or estimations of the current positions. For example, U.S. Pat. Nos. 6,731,237, 6,697,736, 6,694,260, 6,516,272, 6,427,122, and 6,317,688 describe various techniques to integrate GPS systems with inertial sensors or units (gyros and accelerometers), altimeters, compass, or magnetometers using various linear and nonlinear filters to improve either reliability or accuracy of real-time positioning. U.S. Pat. Nos. 6,826,478, 6,801,159, and 6,615,136 disclose various techniques to increase the real-time INS positioning accuracy or correct the real-time error by incorporating stored map and location information, second sensor data, or predetermined perimeter threshold. U.S. Pat. No. 6,810,324 increases the real-time positioning accuracy by substituting high quality position measurements with upgraded low quality position measurement when the high quality measurement is not available. U.S. Pat. No. 6,853,687 describes a method to improve the real-time performance of the RTLS by incorporating magnetic field proximity-based pingers into the RFID tags. U.S. Pat. Nos. 6,766, 247, 6,728,637, and 6,615,135 disclose various specific methods to increase positioning accuracy by incorporating map or route information in a GPS or other sensor.

But these solutions do not solve one of the important problems in the inventory and resource tracking environment: What happens when the real-time position solution is inaccurate, missing or is lost. And what happens after such erroneous information is reported or entered into an inventory database. As a simple example, a real-time positioning system based on an expansive tightly integrated GPS/INS solution can drift away from the true positions when the system enters an area with less than four GPS satellite coverage for a long period of time. In a typical inventory or resource tracking environment, inaccurate location measurements, if not corrected in time, can generate and propagate into widespread inventory or database errors. This occurs especially when tracking the position of containers or vehicles in a warehouse, container yard, or rail yard where tracking signals can be blocked. Resultant errors often require manual correction. The corrupted inventory database thus creates delays and often expensive corrective measures in resource management and inventory controls.

To correct for errors encountered even when GPS is combined with another system, such as INS, post-processed positioning techniques have been used to apply geographic information to obtain accurate survey position solutions. For example, U.S. Pat. No. 6,804,621 describes post-processed methods for aligning measured track data with locations on a digital map to correct geographic map locations.

Post-processing of position information can identify embedded unknown parameters and noises, and resolve the past position solutions. It would be desirable to provide a system that monitors real-time position data of an object such as a cargo container, and performs automatic post-processing to correct position data when signals are blocked or distorted in a timely fashion to provide position data with a high confidence level.

SUMMARY

Embodiments of the present invention provide an improved positioning method and system that, in addition to obtaining and reporting real-time position data, also automatically provide post processing correction in a real-time fashion as data signals are received.

The system employs one or more positioning systems, such as GPS, to detect first real-time position data. Secondary sensors, such as INS or speed or wheel sensors, are also used in some embodiments to improve the GPS data accuracy and provide motion data. A first real-time motion trajectory is then determined, and reported when requested. The first position data in either case is stored in an inventory database.

To provide automatic error correction post processing in a timely fashion, a segment of a second calibrated trajectory is continuously determined using the first position data by applying a mathematical algorithm that includes a filter to the position data to remove inaccuracies based on the noise and error propagation models and the signal statistical properties of signals in the first position data. The filter applies iteration and post-processing techniques to identify and remove the noise, bias, and other unknown terms to result in a calibrated trajectory providing a significantly higher confidence level to a user than a conventional real-time solution. Errors in the first real-time position data are identified by comparing the first real-time trajectory with the second calibrated trajectory to identify segments of the first trajectory showing unacceptable error. In one embodiment, errors are determined when data differences exceed a defined threshold that is associated to a specified confidence or trustworthiness level.

The first position data, in some embodiments, is then updated and continuously corrected to provide revised second position data. The system can continuously and automatically detect and identify the inventory storage location of errors generated by the first real-time position data. The system can, thus, provide an error correction data list for an inventory or database, and report the inventory location and status errors or simply update the inventory.

The following is an example of embodiments of the present invention. Although a tightly integrated GPS/INS system usually reports its real-time position solutions when entering an area with less than four GPS satellite coverage for a long period of time, the solutions can drift away from true positions. Providing real-time post processing according to the present invention can correct for the noise or errors encountered. The post-processing system can clearly identify the equivalent noise and drift terms in the INS after the GPS system has regained sufficient coverage for a period of time. The post-processed positioning system can fit the INS position solutions with respect to the segments of the "good" GPS data before and after the "bad" GPS coverage areas, and resolve trustworthy past trajectories in areas between these "good" GPS coverage segments. By iterating the trajectory fitting techniques using adjustable data segments until a statistically good fit between the calibrated past trajectory and the "good" GPS trajectory segments is achieved, embodiments of the present invention can discover and correct the past real-time position errors with high probability while continuously reporting real-time position solutions.

BRIEF DESCRIPTION OF THE DRAWINGS

Further details of the present invention are explained with the help of the attached drawings in which.

DETAILED DESCRIPTION

Figure 1:
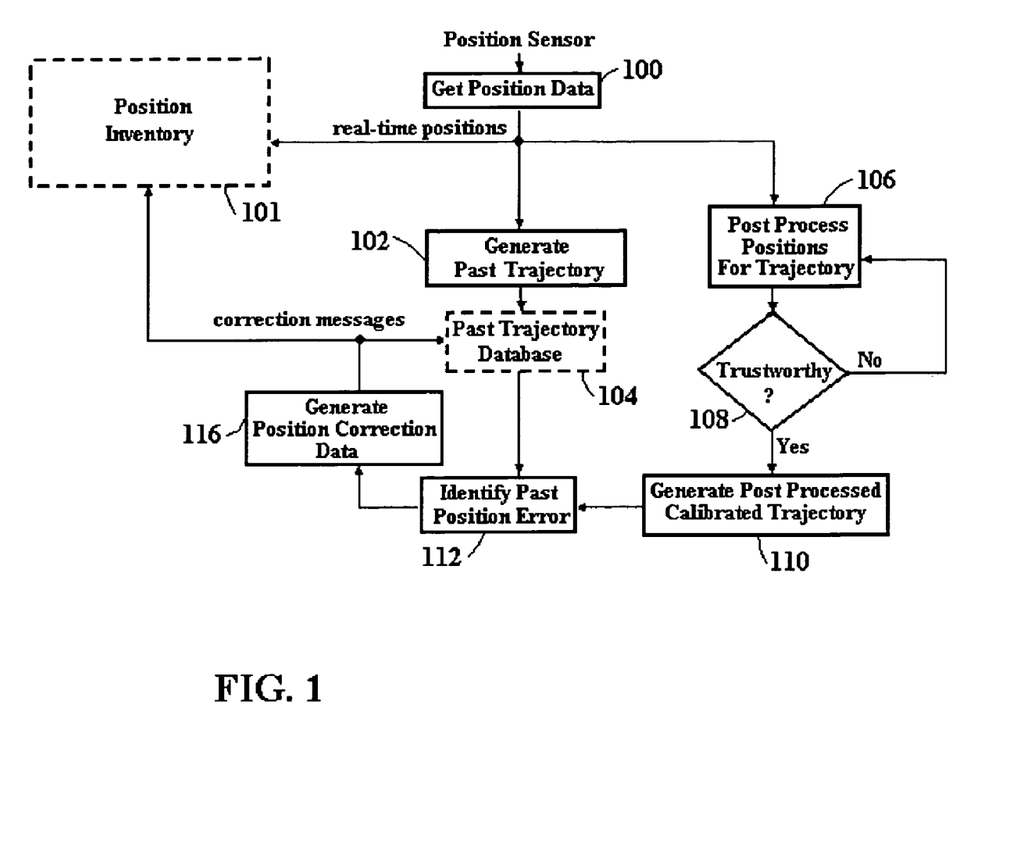
FIG. 1 is a flowchart illustrating basic operation of a method for tracking real-time positions and correcting past trajectory of a mobile object in a real-time fashion.

FIG. 1 is a flowchart illustrating basic operation of a method for tracking real-time positions and correcting past trajectory of a mobile object in a real-time fashion. Initially in FIG. 1, real time data is obtained in step 100 from the position sensor. The position sensor typically includes a combination of a positioning sensor such as a GPS sensor, and a sensor indicating movement such as an INS or speed sensor. In one embodiment, the position data includes a confidence level parameter indication from the position sensor. The position data obtained is provided to an inventory 101 for storage. The real time position data is further provided to step 102 for determining past trajectories that are stored in a past trajectory database 104. Ideally, the past trajectory in step 102 includes the available position solutions that have been obtained or reported in real time. The real time position information from step 102 is also provided to steps for determining trajectory errors beginning with step 106. In one embodiment, step 102 and step 106 include determination of the trajectory or data confidence level when such determinations are available.

To provide a calibrated trajectory to later enable determine if trajectory errors occurred, in step 106 a trajectory is determined based on the real time position data after the data is filtered using mathematical filters or estimation formulas that better determine subsequent positions when position errors potentially occur. In one embodiment, the estimation formulas include mathematic terms or parameters that account for the accumulated effects of the noise and errors in the position data. In further embodiment, the estimation formulas further include noise and error models describing the propagation of the noise and error in the trajectory calibration process. In step 106 the trajectory can be post processed by estimating and calibrating the noise and error terms to result in a more trustworthy past trajectory. In a further embodiment, step 106 includes fitting the post-processed trajectory by calibrating parameters to match selected segments of trustworthy past real-time trajectory. In step 108 the trajectory calculated is evaluated, and if the trajectory is determined to be unacceptable it is sent back trough an iterative regression or fitting process to recalculate filtered position data more accurately in step 106 before reevaluation again in step 108. Once the trajectory or a segment of trajectory passes evaluation in step 108, the process proceeds to step 110 to determine a calibrated trajectory based on the filtered position data.

To determine trajectory errors, the calibrated trajectory from step 110 is compared with the past trajectory from database 104 to identify position errors in step 112. If trajectory errors exceed a predetermined range as determined in step 112, in a further step 116 a correction message is sent to update the inventory 101. In one embodiment, the error correction information is further sent to update the past trajectory database 104. The above steps are repeatedly performed to correct errors in the past real-time positions as new data is continuously provided by the position sensor.

Figure 2:
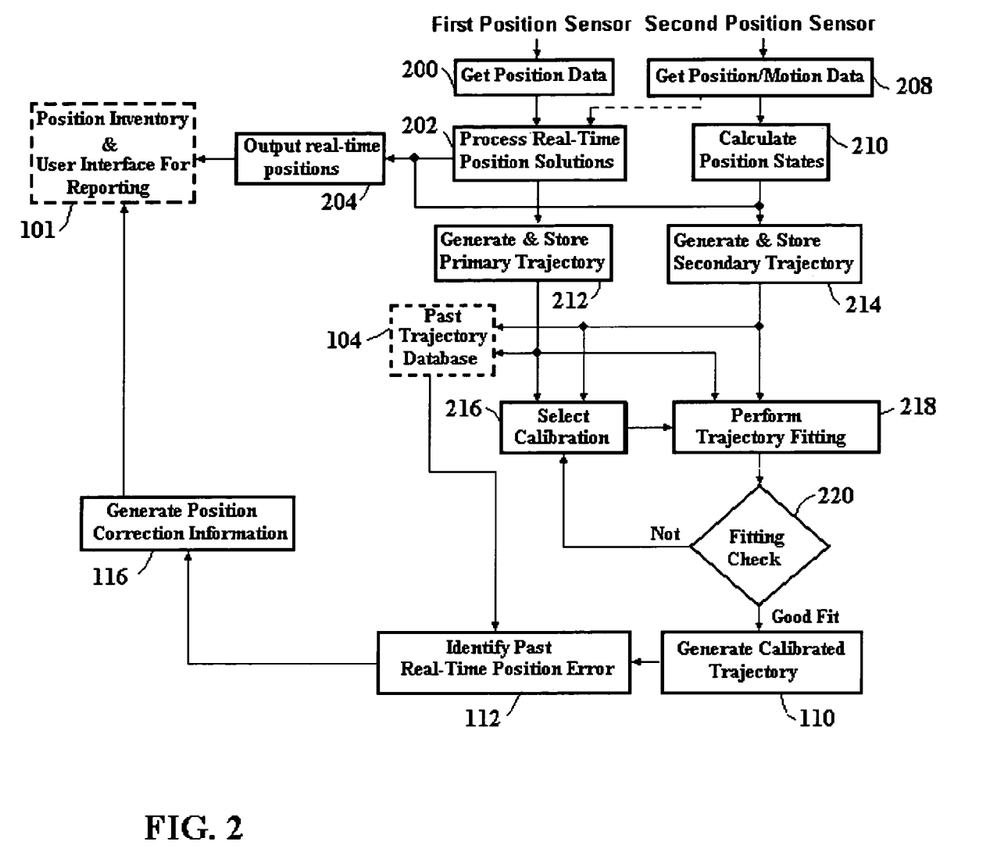
FIG. 2 is a flowchart for a method for tracking real-time positions as modified from FIG. 1 to include two sensors, as well as to describe additional details of calibration and error correction.

FIG. 2 is a flowchart for a method for tracking real-time positions as modified from FIG. 1 to include two types of sensors, as well as to describe additional details of calibration and error correction. Steps carried over from FIG. 1 are similarly labeled, as will be steps or components carried forward in subsequent drawings. Initially in FIG. 2, sensor signals are obtained in step 200 from a first position sensor, such as a GPS sensor, and processed in step 202 to provide real time position data. In one embodiment, the position data include the confidence level parameters from the position sensor. The real time position data is then provided to a database 101 for storage in step 204. In one embodiment, position data can be reported as further illustrated in item 101. In step 212, the real time position data from the first position sensor is processed to create a primary motion trajectory that is stored in past trajectory database 104.

Further, in step 208 a second position sensor is used to collect motion data. The motion data collected can be either in the form of a trajectory, or used in step 214 to calculate the trajectory. In one embodiment, the second position sensor is an INS sensor. In another embodiment, the second position sensor includes inertial sensors and speed or wheel sensors. With the second INS system sensor, uninterrupted, position data can be provided when the first sensor data is blocked or distorted, in step 210. Position data lost by the first position sensor can be calculated from the data from the second position sensor and then provided to determine positions in step 204. In other embodiments, the motion data from step 208 is also used to in the real-time position solution in step 202.

Once a past trajectory is determined, either in step 212 or step 214, the past trajectory data is stored in database 104. The trajectory real time position information can further be provided from steps 212 or 214 to step 218 to enable calibration to set post processed trajectory data within acceptable standards. In one embodiment, the stored trajectory data in step 104 is also used in step 218. A past trajectory is determined in step 218 using the trajectory data described above after the data is filtered using mathematical filters or estimation formulas that better determine subsequent positions when position errors potentially occur. In one embodiment, the estimation formulas include mathematic terms or parameters that account for the effects of the noises and errors in the position data. In further embodiments, the estimation formulas also include noise and error models describing the propagation of the noise effects in the trajectory calibration. In step 218 the trajectory is post processed by estimating and calibrating the noise and error terms to result in a more trustworthy past trajectory. In further embodiment, step 218 includes fitting the post processed trajectory by calibrating parameters to better match the calibrated trajectory to the selected segments of trustworthy past real-time trajectories. Calibration criteria, such as calibration data length for segments of trustworthy trajectories can be determined in step 216 using the first real time position and first trajectory values provided from the steps 212 and 214.

The compared data is checked in step 220 to determine if it is within an acceptable trustworthiness region, and if not the data is provided back for recalibration in step 216, and then for a recomparison in step 218. If the data is within an acceptable trustworthiness area after a number of iterations, the data is used to generate a second post processed trajectory in step 110.

The second calibrated trajectory from step 110 is then used to create new position data that is compared in step 112 with the past first position data from database 104 to update or correct the past position errors. If errors are found to be outside acceptable limits in step 116, the history database is updated with the corrected position errors. In a further embodiment a reporting messages are generated to provide to a user display identifying the errors in the past real-time position data.

The method of FIG. 2, thus, provides for continuously tracking and correcting positions and past trajectory of a mobile object using real-time and post-processed positioning algorithms. Although described with certain steps and databases in FIG. 2, it is understood that combinations of steps, or variations can be provided. For example, in a further embodiment, the database 101 can include second position data in addition to the first position data, the second position data including the position corrections. In another embodiment, the database 101 is used to store real time trajectories, as well as post processed calibrated trajectories and is combined with trajectory database 104. With storage of all trajectory information, the past trajectories can be continuously calibrated using post-processed positioning algorithms and any trustworthy segments of such calibrated past positions will be updated in the past-trajectory database.

Figure 3:
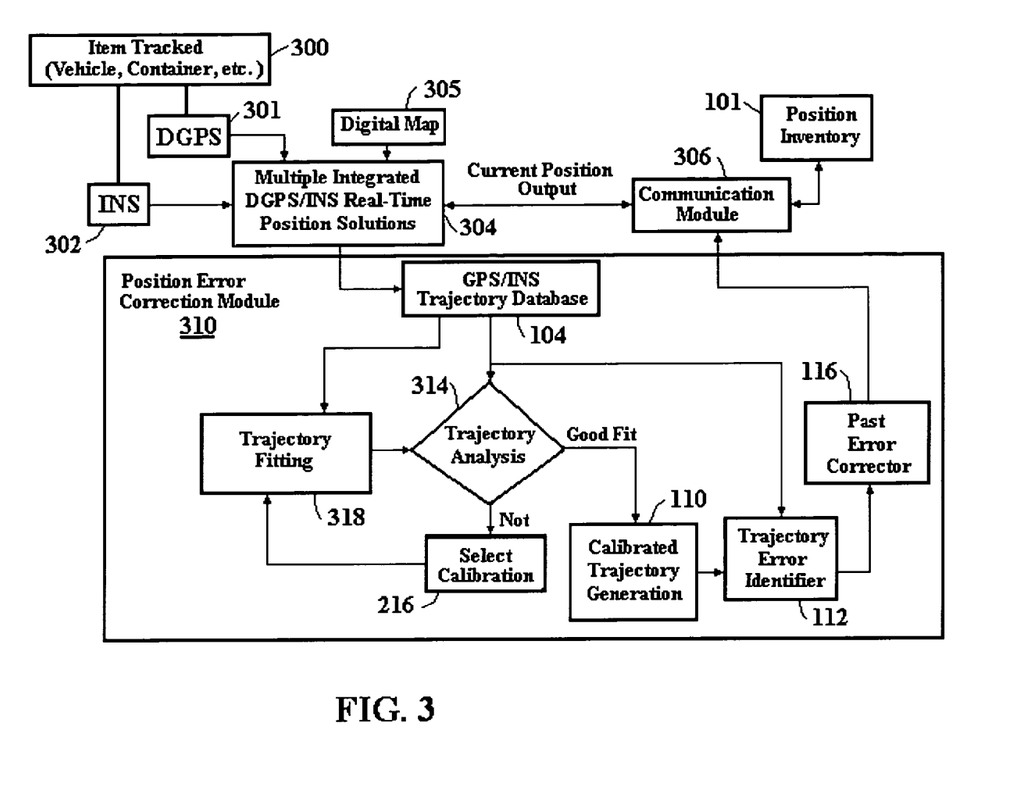
FIG. 3 shows a block diagram of components of a system of the present invention used for correcting and tracking past positions of a mobile object.

FIG. 3 shows a block diagram of components of a system of the present invention used for correcting and tracking past positions of a mobile object. In this embodiment, the real-time position information is obtained from a first sensor system 301, shown as a DGPS system 301, and a second sensor system, shown as an INS system 302. Although the first sensor 301 is shown as a DGPS system and the second sensor 301 is shown as an INS system, it is understood that other motion sensors could be used for embodiments of the present invention. Further, it is contemplated that a single system, such as the DGPS system could be used alone. Figures subsequent to FIG. 3 will reference the first sensor 301 and second sensor 302 generally.

The DGPS system 301 and INS system 302 can be located on an item tracked 300 (e.g., a vehicle, a container, etc.), or be located remotely with sensors detecting the position of the item tracked 300. The Differential GPS unit 301 and INS unit 302 are shown as a tightly coupled DGPS/INS system, with positions and trajectories determined in a combined processor 304. As an alternative, the GPS unit 301 and INS unit 302 may be loosely coupled with separate interacting processors. The real-time position solutions can also be supported by an additional digital map 305, as shown, or other sensors such as a speed sensor or wheel sensor, and compass.

The system of FIG. 3 further includes a position inventory 101 that can be a memory device alone, or further include a display for reporting position data and error information. A communications module 306, which may be simply a memory controller, or a more complex processor is used to provide data to and from the position inventory 101. The communications module 306 receives position data from DGPS/INS processor 304, and provides data to the DGPS/INS processor 304 to enable calculation of trajectories from the position inventory 101.

An error correction module 310 is provided to correct for errors in the position data, especially for those that were already sent to the inventory 101. The error correction module 310 can be formed from a processor, or logic configured for performing the needed tasks, such as an FPGA or an ASIC. The error correction module 310 can be combined with the processor 304 in one embodiment of the present invention. The error correction module internally includes memory and modules performing tasks to correct position errors as described to follow.

The position error correction module 310 initially includes a trajectory database 104 that receives position information from processor 304. The past trajectory information is sent from database 104 to a trajectory analysis module 314. The trajectory analysis module 314 determines if any trajectory error is within acceptable limits. If not, a calibration step 216 is used to modify the criteria and data segments for the post processed trajectory fitting before the trajectory analysis 314 is performed again. A trajectory can be determined in step 318 using mathematical filters or estimation formulas that better determine subsequent positions when position errors potentially occur, as described previously. Once the trajectory analysis module 314 determines the data is within acceptable limits, a calibrated trajectory is generated in module 110 (if it was not previously generated as part of the trajectory analysis), and a comparator 112 is used to compare the calibrated trajectory with the past trajectory from database 104. If the comparison indicates that the past trajectory from 104 is outside acceptable limits, correction information is provided from module 116 back to the communication module 306. The communications module 306 then updates the position data in the position inventory 101, and/or alternatively causes the errors to be reported.

Figure 4:
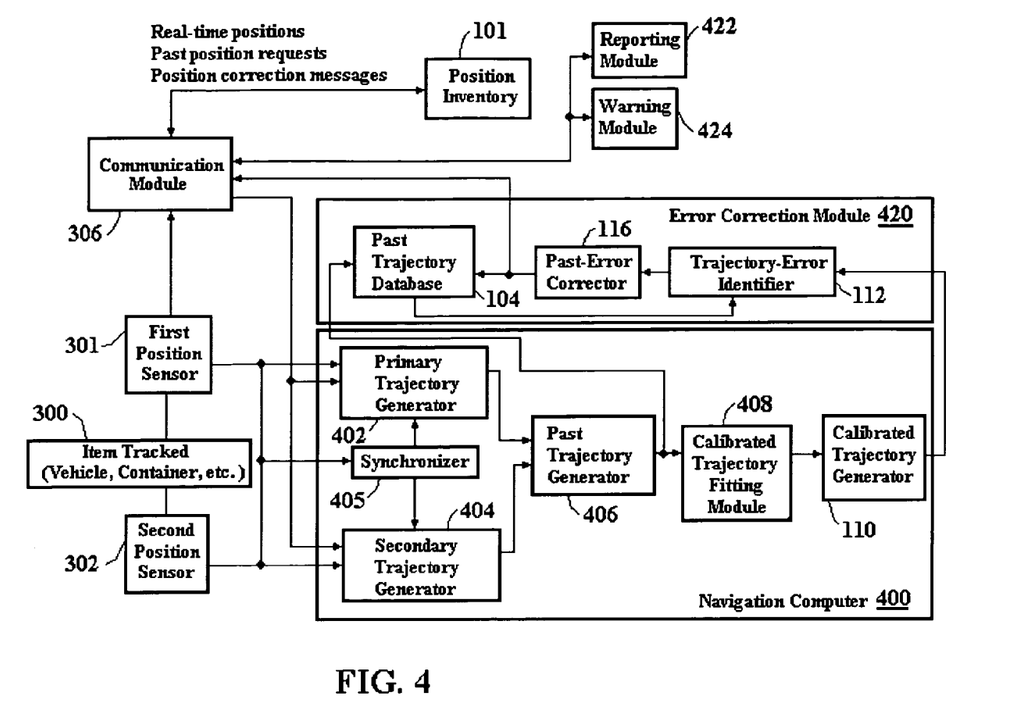
FIG. 4 shows modifications to the system of FIG. 3 to include two sensors and show more details of components for providing past trajectory determination.

FIG. 4 shows modifications to the system of FIG. 3, illustrating the two general sensors 301 and 302 along with more details of components for providing past trajectory determination. FIG. 4 further shows how components can be distributed, with a calibrated trajectory being determined using the navigation computer 400, and with error correction performed in a separate error correction module 420. The error correction module 420 can be, thus, located separate from the navigation computer 400 and potentially not reside on the item tracked 300, but in a separate stationary location.

To determine trajectories, the navigation computer 400 includes a primary trajectory generator 402 connected to receive data from the first position sensor 301 and possibly from the position inventory 101 through the communication module 306, enabling calculation of a trajectory of movement for the item tracked 300. Similarly, the navigation computer includes a secondary trajectory generator 404 connected to the second position sensor 302. The secondary trajectory generator is also connected to the position inventory 101 through the communication module 306 if the second sensor 302 does not provide motion data. The trajectory generators 402 and 404 are synchronized with synchronizer 405, and provide data for the past trajectory generator 406. The past trajectory generator 406 determines if the primary-trajectory data from 402 is accurate, and if not resorts to include the secondary trajectory generator 404 to provide trajectories. The past trajectory generator 406 also provides at least one past trajectory to past trajectory database 104. In one embodiment the past trajectory includes the past position data sent to the position inventory 101. The past trajectory generator 406 also provides an output to a calibrated trajectory determination module 408. The module 408 provides the combined function of modules 314, 216 and 318 from FIG. 3, and can be separated into separate modules. The output of module 408 is then provided to a calibrated trajectory generator 110 if a calibrated trajectory is not already generated.

The error correction modules includes the trajectory error identifier 112 that receives a calibrated trajectory data from generator 110, as well as a past trajectory from database 104, and determines if errors are with acceptable limits. If not, a past error corrector 116 sends a message to communication module 306, and also sends a corrected update to the past trajectory database 104. The communication module 306 then functions to update the position inventory 101, and provide error information to a reporting module 422 and warning module 424. Note that although the communication module 306 is used, communication can be directly made, such as between the past error corrector 116 and the warning module 424. Further, a device, such as a wireless communication device may be included in one embodiment to transfer data between the navigation computer 400 and the error correction module 420. In one embodiment, the navigation computer 400 and error correction module 420 can be combined. Further, the position inventory can be connected to a user interface to allow viewing of the data as described previously.

Figure 5:
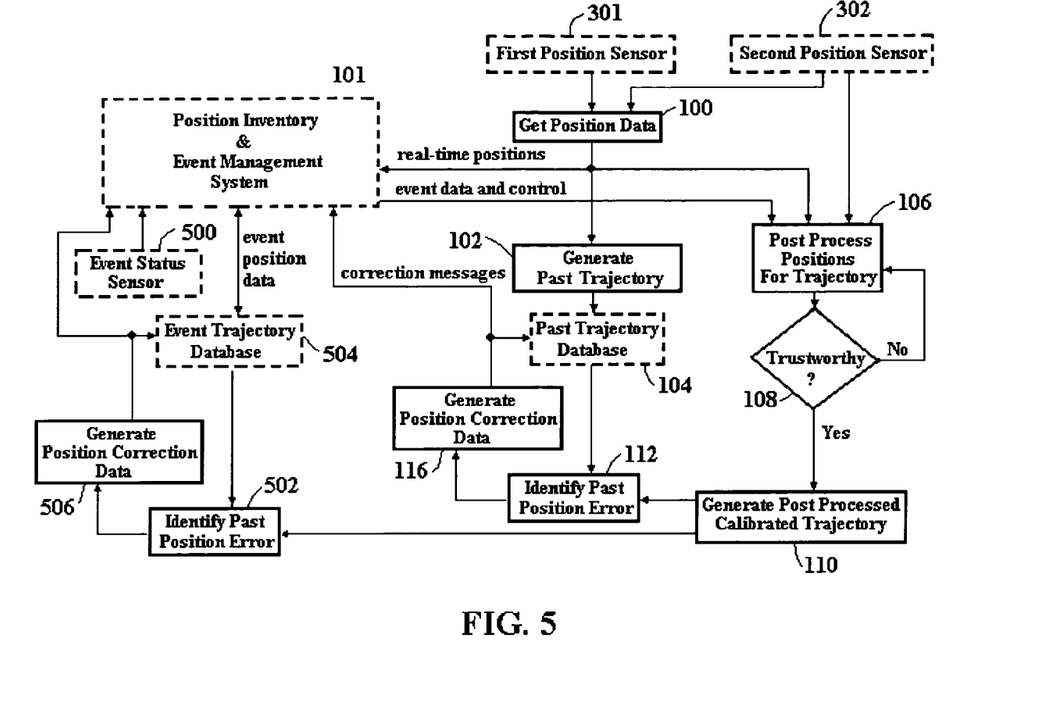
FIG. 5 is a flowchart providing modifications to FIG. 1 to provide error corrections for events occurring after real-time data is acquired that can affect position information.

FIG. 5 is a flowchart providing modifications to FIG. 1 to provide error corrections for events occurring during and after real-time data is acquired. Recording events in a database can be sensitive to position accuracies, especially when such events indicate inventory transactions, e.g., picking up a container from a certain location at a certain time, or moving several inventories around different locations. An event can also occur to provide erroneous data in a number of ways. For example, if the item tracked has a GPS sensor as a first position sensor 301 and travels through a tunnel blocking GPS reception, the second position sensor 302, such as an INS sensor, provides the position data. The INS data, however, can vary significantly from an actual location, particularly the longer the INS system is used without reference to GPS position data. A similar event can occur if some of the satellites providing GPS data in a location become inactive, for example due to blockage or reflection, significantly reducing the accuracy of data that is received, but later come back on line to provide extremely accurate data.

To correct for errors when an event occurs, initially a status sensor 500 is included to alert a user interface or controller provided with a position inventory 101 to indicate when an event occurs either affecting or linked to position data previously obtained. The status sensor 500 can be attached to the item being tracked, or attached where the first position sensor 301 is located or where the event can be observed.

The position inventory and event management system 101 respond to the status sensor 500 by providing position data to an event trajectory database 504, enabling the determination of trajectories during the time that the event occurred that may either create or be linked to erroneous past data. In one embodiment, the event trajectory database 504 is combined with the past trajectory database 104, although they are separated in FIG. 5 for purposes of illustration.

Further, the position inventory and event management system 101 sends data for purposes of calibration to provide a post processing of the trajectory to step 106 when an event occurs. Calibrated position data is then generated in an iterative or regression process in steps 106 and 108, and a calibrated trajectory for the event data is generated in step 110.

In FIG. 5, steps 502 and 506 are provided for evaluation of the calibrated event trajectory. In one embodiment, the steps 502 and 506 are combined with respective steps 112 and 116 that perform the same function for real-time data being gathered, the steps operating concurrently. In step 502, past trajectories from the database 504 are compared with calibrated event trajectories from step 110. If the past trajectories are determined to have errors greater than acceptable limits in step 502, the calibrated trajectory from step 110 is used in step 506 to provide corrected data to the position inventory 101 and to the event trajectory database 504.

The position inventory and event management system 101 continues sending event data for calibration until all the event data has been rechecked and determined to be within acceptable limits. In one embodiment, rules and logic for event retracing are used in step 101 to optimize the event data rechecking when potential propagation of inventory errors occurs.

Figure 6:
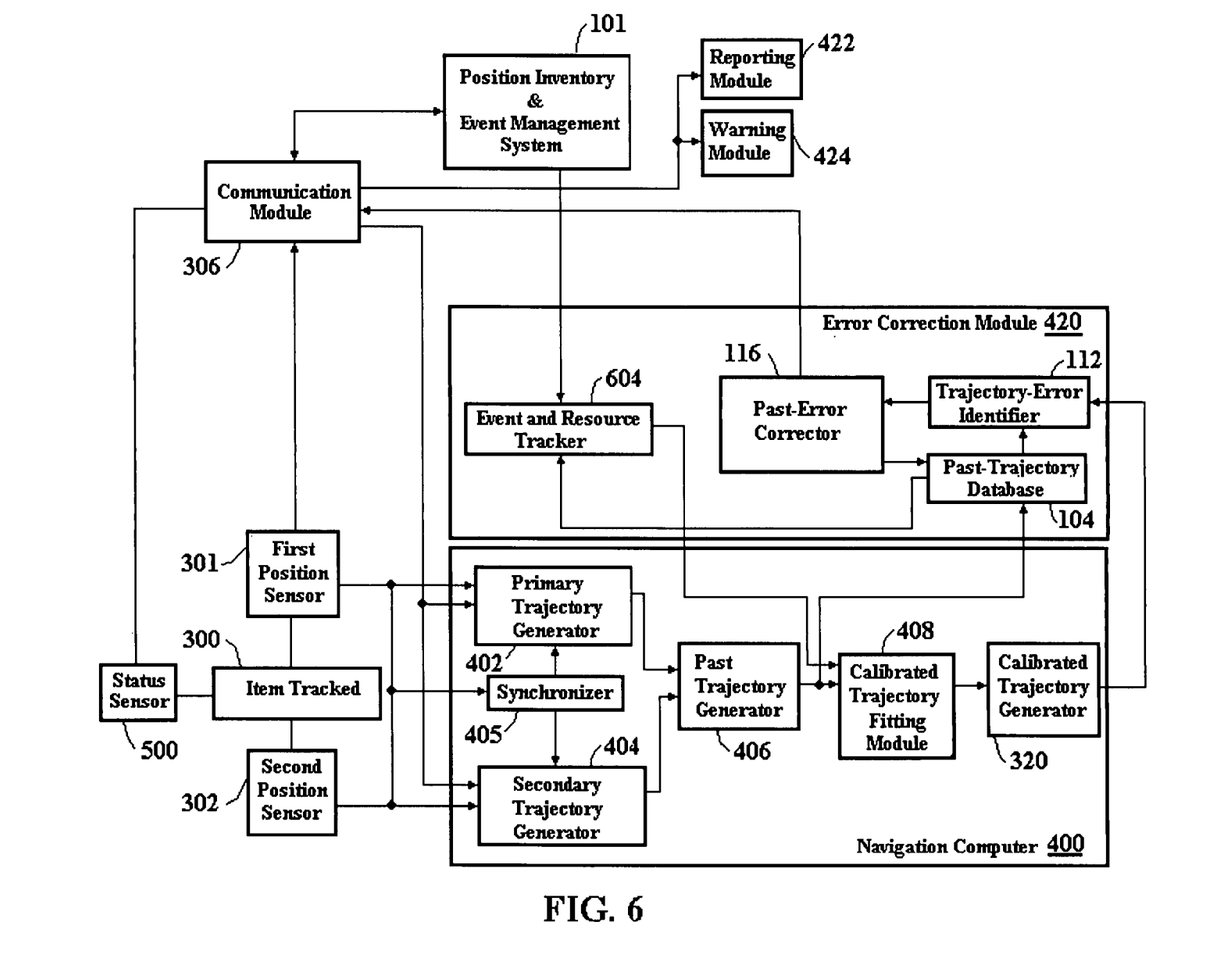
FIG. 6 shows the system of FIG. 4 modified to provide event error correction as described in the method steps of FIG. 5.

FIG. 6 shows the system of FIG. 4 modified to provide event error correction as described in the method steps of FIG. 5. The system of FIG. 4 is modified to include a status sensor 500 to detect events, and to include an event and resource tracker 604 to enable correction of the event data. The past trajectory database 104 provides the combined function of the event trajectory database 504 and past trajectory database 104 of FIG. 5, although they could be separated. Similarly, the trajectory error identifier 112 serves to identify errors between calibrated and past data, although a separate event error identifier could be used.

In operation, once an event is detected by status sensor 500, the position inventory and event management 101 operates the event and resource tracker 604 to reprocess data received during the event. The event and resource tracker 604 provides the data for calibration to module 408, and resulting errors are detected and correction data is returned to the communication module. In one embodiment, the event and resource tracking 604 also schedules an event retracing procedure when a past error has already propagated to create additional inventory errors. As with FIG. 4, in FIG. 6 components in the navigation computer 400 and event correction module 420 can be combined into a single unit or distributed to best serve particular design requirements.

Figure 7:
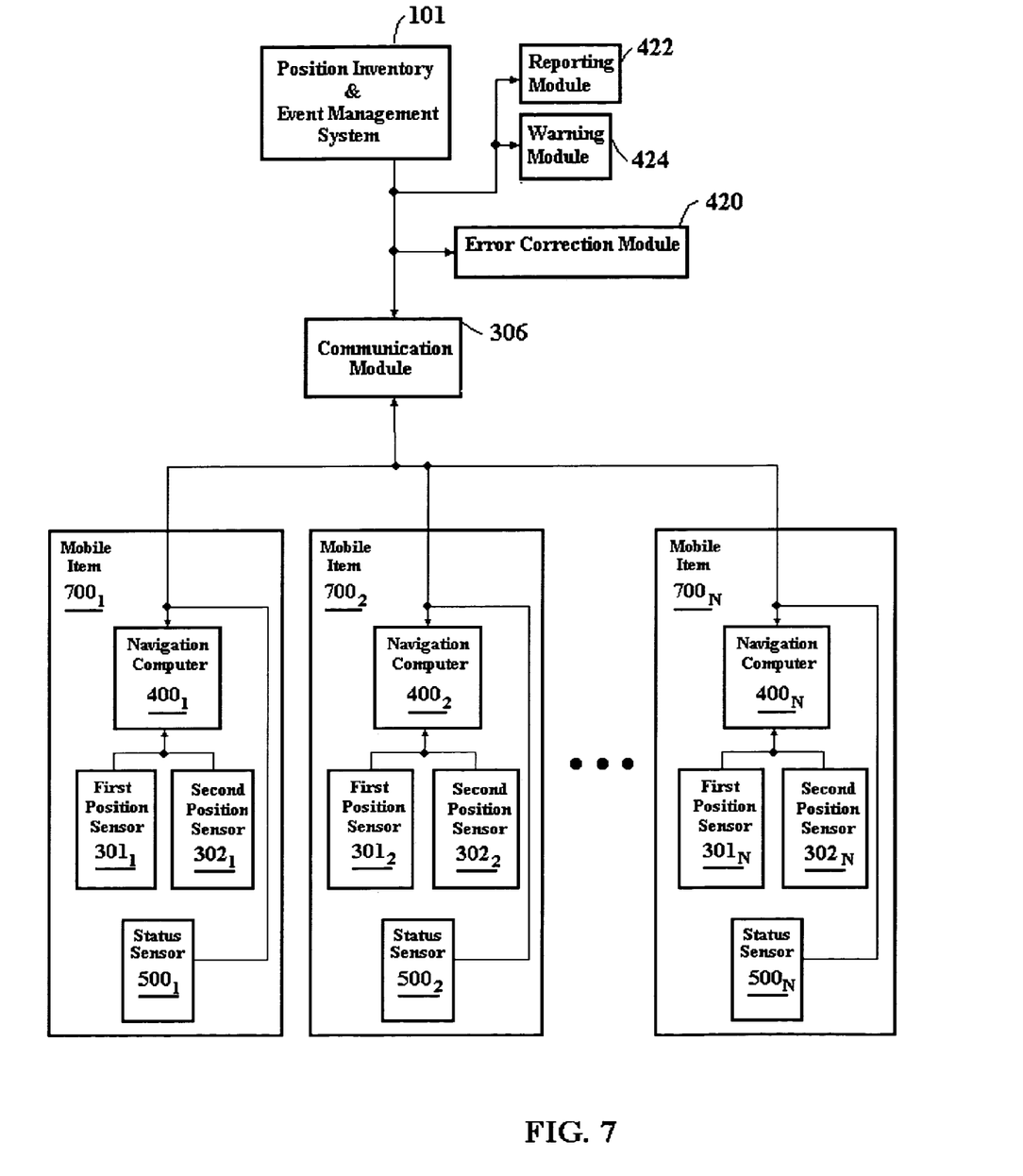
FIG. 7 shows a block diagram of a system architecture for tracking multiple mobile items and correcting for position errors according to the present invention.

FIG. 7 shows a block diagram of a system architecture for tracking multiple mobile items $700_1$-$700_N$, and correcting for position errors according to the present invention. The mobile items $700_1$-$700_N$ each include components shown from FIG. 6, although it is understood that some components, such as the navigation computers $400_1$-$400_N$ can be combined and moved off of the mobile items $700_1$-$700_N$ into a separate stationary unit. Similarly, stationary components shown in FIG. 7, such as the inventory and event error correction module 420, can be separated and included on each mobile item $700_1$-$700_N$. In FIG. 7, tracking and error correction components are shown in block diagram from FIG. 6, although it is understood that more limited components, such as those in FIG. 1, could be used.

Although the present invention has been described above with particularity, this was merely to teach one of ordinary skill in the art how to make and use the invention. Many additional modifications will fall within the scope of the invention, as that scope is defined by the following claims.

What is claimed is:

1. A position tracking system comprising:

a positioning unit associated with a mobile object configured to provide first positions of the mobile object, wherein the positioning unit comprises sensors providing measurements related to positions of the mobile object and wherein the positioning unit provides the first positions in real time at discrete time instances with one of the first positions generated at each time instance;

a data storage unit configured to store the first positions in real time and configured to aggregate the stored first positions to form a first trajectory depicting past movement of the mobile object, wherein the first trajectory comprises a plurality of consecutive first positions;

a navigation processing module configured to generate second positions to form a second trajectory based on the first positions wherein the navigation processing module uses ones of the first positions corresponding to later time instances to determine the second positions corresponding to earlier time instances; and an error correction computation module configured to compare the second trajectory from the navigation processing module with the first trajectory and generate correction data indicating data errors in the first trajectory, whereby the second trajectory depicts the past movement of the mobile object more accurately than the first trajectory.

2. The system of claim 1, further comprising a reporting module connected to the error correction computation module and configured to provide messages indicating locations and magnitudes of the said data errors in the first positions as stored in the data storage unit.

3. The system of claim 1, wherein the positioning unit further comprises:

a first sensor configured to measure positions of the mobile object, and a second sensor configured to provide at least one of the following information that supports determination of the first positions of the mobile object: linear motion data, angular motion data, linear velocity data, angular velocity data, linear acceleration data, and angular acceleration data;

whereby the positioning unit is configured to integrate measurements from the first sensor with measurements from the second sensor to provide the first positions.

4. The system in claim 1, wherein the navigation processing module is further configured to generate the second trajectory by iteratively generating and calibrating an adjustable segment of the second trajectory data using a mathematical model for the mobile object until the adjustable segment is determined statistically trustworthy.

5. The system in claim 1, wherein the error correction computation module is further configured to correlate the first trajectory with the second trajectory to identify segments of the first trajectory that require correction by comparing the data errors with a threshold, and wherein the data storage unit further stores the second trajectory corresponding to the identified segments of the first trajectory.

6. The system in claim 1, wherein the error correction computation module updates the first position data with the corrected data to provide second position data and stores the second position data in the data storage unit.

7. The system in claim 1, wherein the error correction computation module is further configured to report the correction data to an external device including at least one of a user interface and a database.

8. The system of claim 1, wherein the positioning unit resides in the mobile object, and wherein the navigation processing module and the error correction computation module reside away from the mobile object and are wirelessly linked to the positioning unit.

9. The system of claim 1, wherein the positioning unit and the navigation processing module resides in the mobile object, and wherein error correction computation module resides away from the mobile object and is wirelessly linked to the positioning unit and the navigation processing module.

10. The system of claim 1, wherein the positioning unit, the navigation processing module and the error correction computation module reside in the mobile object.

11. The system of claim 1, wherein the navigation processing module is further configured to employ a post-processing estimation filter to provide the second trajectory to more accurately depict the past movement of the object than the first trajectory.

12. The system of claim 4, wherein when the adjustable segment is not determined statistically trustworthy after a predetermined number of times, the navigation processing module will extend a duration of the adjustable segment.

13. A position tracking system comprising:

a positioning unit associated with a mobile object configured to provide first positions of the mobile object, the positioning unit comprising:

a first sensor comprising a Global Positioning System (GPS) receiver configured to provide position measurements of the mobile object; and a second sensor configured to provide at least one of a velocity of angular movement of the mobile object and a velocity for linear movement of the mobile object, wherein the positioning unit includes a processor configured to provide first positions of the mobile object in real time based on a combination of outputs from the first and second sensors;

a data storage unit configured to store the first positions in real time and aggregating the stored first positions to form a first trajectory depicting past movement of the mobile object, wherein the first trajectory comprises a plurality of consecutive first positions;

a navigation processing module configured to generate second positions to form a second trajectory wherein the second positions are generated based on first positions of the first trajectory that have a higher trustworthiness level than other ones of the first positions of the first trajectory; and an error correction computation module configured to compare the second trajectory with the first trajectory and to generate correction data indicating data errors in the first trajectory.

14. The system in claim 1, wherein the positioning unit is further configured to provide trustworthiness levels associated with the first positions; and wherein the navigation processing module is further configured to generate the second trajectory using the later positions which have higher ones of the trustworthiness levels than the earlier first positions.

\* \* \* \* \*